United States Patent [19]
Arthur et al.

[11] 3,835,734
[45] Sept. 17, 1974

[54] CUTTING TOOLS

[75] Inventors: George Arthur; Derek James Brown, both of Newcastle-upon-Tyne, England

[73] Assignee: International Research & Development Company Limited, Fossway, Newcastle upon Tyne NE6 2YD, England

[22] Filed: July 11, 1972

[21] Appl. No.: 270,628

[30] Foreign Application Priority Data
July 14, 1971   Great Britain................ 33111/71
Nov. 26, 1971   Great Britain................ 55049/71

[52] U.S. Cl............................................. 76/101 A
[51] Int. Cl............................................ B21k 21/00
[58] Field of Search........................... 76/101 A, 101

[56] References Cited
UNITED STATES PATENTS

| 1,415,021 | 5/1922 | DeBats............................... 76/101 A |
| 1,922,178 | 8/1933 | Schultz .............................. 76/101 A |
| 1,952,002 | 3/1934 | Trembour......................... 76/101 A |
| 2,002,229 | 5/1935 | Trembour et al................. 76/101 A |
| 2,023,908 | 12/1935 | Trembour......................... 76/101 A |
| 2,041,346 | 5/1936 | Jaques .............................. 76/101 A |
| 2,070,156 | 2/1937 | DeBats............................... 76/101 A |
| 2,950,524 | 8/1960 | Frommelt et al. ............ 76/101 A X |

*Primary Examiner*—Harrison L. Hinson
*Attorney, Agent, or Firm*—Kemon, Palmer & Estabrook

[57] ABSTRACT

A method of manufacturing a cutting tool such as a hacksaw blade in which a tool steel body in solid or powder form is encased in a low alloy steel container and hot rolled to develop a bond between the body and the container, after which part of the container is machined away to expose a tool steel cutting edge.

4 Claims, 9 Drawing Figures

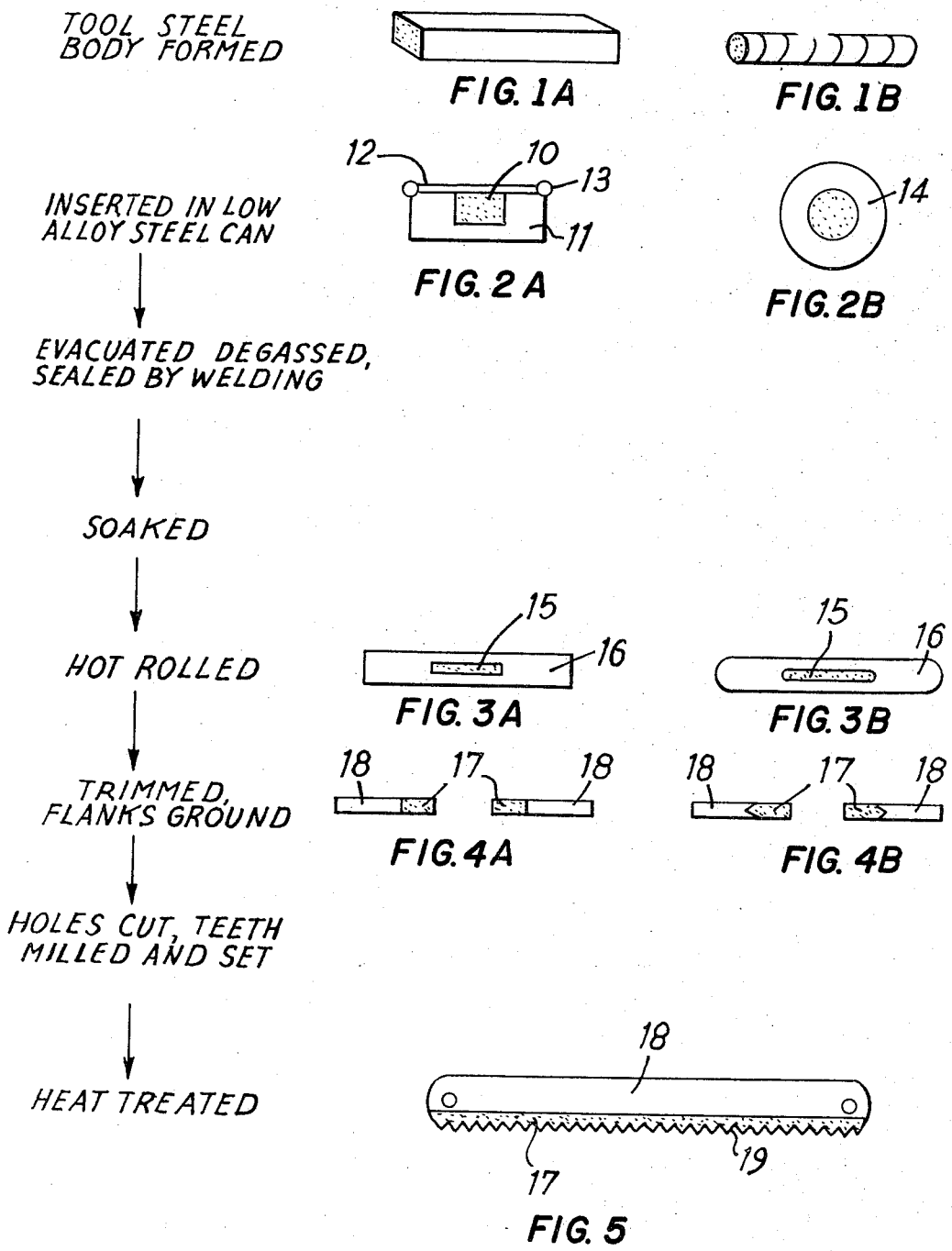

CUTTING TOOLS

The present invention relates to the manufacture of cutting tools having a cutting edge of tool-steel.

In accordance with the present invention there is provided a method of manufacturing a cutting tool comprising enclosing a body of tool-steel within a low-alloy steel container, hot-rolling the container to form a tool-steel insert within the container bonded to the walls of the container, and subsequently machining one or more surfaces of the container to expose a part of the tool-steel insert to form a cutting edge.

The exposed cutting edge may be subsequently shaped and machined, for example, to provide cutting teeth.

The cutting tool may be further treated to improve the hardness of the tool-steel.

The product of the method in accordance with the invention is a cutting tool having a hard tool-steel cutting edge firmly bonded to a low-alloy steel backing which has high impact strength. Such a composite structure may be tougher than a tool made wholly of tool-steel and in addition may be cheaper to produce.

The tool-steel body can be in powder form and may be pre-compacted or packed loosely in the container and compacted during the subsequent treatment. The compaction of metal powders into continuous lengths by rolling is well known but the economics of the process depend heavily upon the cost of the powders. Pre-alloyed powders of high quality have been produced by atomisation of low-alloy, stainless and tool-steels. Other elemental powders are available, for example, nickel and cobalt, as well as many of the refractory alloying elements found in tool-steel, such as tungsten, molybdenum and vanadium.

Conventional controlled pressing and sintering techniques have not been entirely successful in producing a sufficiently dense structure from tool steel powder at a temperature below that at which undesirable coarsening of the carbide distribution occurs. The present invention enables a fully dense metallic structure to be produced from powder while maintaining reasonable homogeneity.

FIGS. 1A and 1B illustrate different forms of a tool steel body.

FIGS. 2A and 2B illustrate the respective tool steel bodies of FIGS. 1A and 1B enclosed in a low alloy steel can.

FIGS. 3A and 3B illustrate the respective tool steel bodies inserted in low alloy steel cans of FIGS. 2A and 2B after being hot rolled.

FIGS. 4A and 4B respectively illustrate the hot rolled composites of FIGS. 3A and 3B after being trimmed and divided with the flanks being round.

FIG. 5 illustrates a cutting blade as may be made from one of the blanks of FIGS. 4A or 4B.

The invention will now be described in more detail with the aid of examples illustrated in the accompanying drawing, which is a flow diagram of a method in accordance with the invention for the production of a hack-saw blade, with illustrations of two alternative forms of the assembly at various stages in the method.

The first stage of the method is the formation of a tool-steel body. At 1A is shown a body in the form of a solid rectangular bar of tool-steel. The body shown at 1B is made up of a number of cylindrical pellets which have been produced by compaction of tool-steel powder.

In the second stage the tool-steel body is enclosed in a suitably-shaped low-alloy steel can. In the cross-section shown at 2A the rectangular bar of tool-steel 10 is disposed in a rectangular box 11 closed by a flat plate forming a lid 12. In the next stage the lid 12 is welded to the box 11 at 13. The cylindrical compacted powder body shown at 1B is inserted in a tubular container 14 as shown in cross-section at 2B.

The container is preferably evacuated and de-gassed before being sealed by welding. The resulting assembly is then soaked, that is, held at a constant high temperature, for a suitable period prior to hot rolling. The hot rolling, which can be carried out in stages, reduces the cross-section of the assembly and changes its shape, as shown at 3A and 3B. At the same time it develops a firm bond between the tool-steel insert 15 and the low-alloy container 16 surrounding it.

In the next stage of the method the composite band formed by hot-rolling is cut along its length through the centre of the tool-steel insert 15 and the sides of the container 16 are ground away, thus forming a pair of strips as shown at 4A and 4B, each with a tool-steel edge 17 bonded to a low-alloy backing 18.

Location holes are punched in the backing 18 and the tool steel edge 17 is milled to form cutting teeth 19 which are set as required. The resulting blade shown at 5 is finally heat-treated to harden the cutting edge.

As stated above, the tool-steel body may be in solid or powder form. In the case of powder this may be pre-compacted as described above under a pressure of 20 to 50 tons/sq. in. or placed in the container in the form of loose powder which is lightly tamped into the container and then compacted in the subsequent stages of the process. The powder may be pre-alloyed material which has been powdered, for example, by atomisation, or may be a mixture of finely-divided elemental powders. The solid insert may be produced by any conventional methods. Wrought or cast material can be used.

Conventional tool-steel compositions may be used for both the solid and the powder bodies. Examples are the alloys M2 and T1 having the following compositions:

M2 6 percent W, 5 percent Mo, 4 percent Cr, 2 percent V, 0.85 percent C

T1 18 percent W, 4 percent Cr, 1 percent V, 0.7 percent C.

Other tool-steel compositions which are difficult to fabricate into bar or strip, for example because of segregation and/or high carbide loadings, can be used in powder form. One such composition which is based on the M2 alloy but with additions of vanadium and carbon which give an increased proportion of carbide is described in our British Patent application No. 10862/72.

The low-alloy steel for the container can be chosen from a wide range of steels to provide the most suitable properties, for example, heat and corrosion resistance, for specific applications. It preferably has a low or medium carbon content. For hacksaw blades a spring steel is chosen, for example the alloy En 47 having the composition 1 percent Cr, 0.15 percent V, 0.45–0.55 percent C.

In the process of sealing the container around the tool-steel body the container is preferably evacuated and de-gassed by being held at 1,100°C. for half an hour under a vacuum of $10^{-3}$ torr. The assembly is then soaked at a temperature in the range 950° – 1,150° C. and hot-rolled in stages, with reheating where required, to a sufficient reduction, for example 90 percent, to close any gap between the tool-steel body and the container, to make a powder insert fully dense, and to develop the full strength of the bond between the tool steel of the insert and the low-alloy steel of the container.

The invention produces a cutting tool having a cutting edge of tool-steel of high uniformity and fine structure which provides an improved cutting edge whilst maintaining a strong bond between the tool-steel and the tough low-alloy steel backing. In the embodiment described, the inclusion of a substantial mass of tough backing metal enables a blade to be produced which is tougher than a blade made wholly from tool-steel, as well as being cheaper to manufacture.

The invention is not limited to the embodiment described and may be used on any tool requiring a tool-steel cutting edge or face, for example, twist drills, shears, wood-working tools, etc.

We claim:

1. A method of manufacturing a cutting tool comprising the steps of:
   a. forming in a low alloy steel container a body of tool steel from powdered material;
   b. enclosing said body within said low alloy steel container;
   c. hot-rolling the assembly of tool-steel body and container to bond the body to the container; and
   d. machining at least one surface of the container to expose part of the tool-steel body to form a cutting edge.

2. A method as claimed in claim 1, wherein said step of enclosing the tool-steel body includes the steps of evacuating and de-gassing the container and sealing the container.

3. A method as claimed in claim 1 including the step of forming cutting teeth on the exposed cutting edge.

4. A method as claimed in claim 3 including the further step of heat-treating the assembly after formation of the cutting teeth to harden the cutting edge.

* * * * *